United States Patent [19]

Hamano et al.

[11] Patent Number: 4,841,803
[45] Date of Patent: Jun. 27, 1989

[54] LUBRICATION MECHANISM IN POWER TRANSFER DEVICE FOR FOUR WHEEL DRIVE

[75] Inventors: Hideo Hamano; Yasumichi Funato; Shuichiro Ida, all of Toyota, Japan

[73] Assignee: Toyota Jidosha Kabushiki Kaisha, Aichi, Japan

[21] Appl. No.: 156,746

[22] Filed: Feb. 18, 1988

[30] Foreign Application Priority Data

Feb. 20, 1987 [JP] Japan ............................. 62-24797[U]

[51] Int. Cl.$^4$ ...................... F16H 37/06; F16H 57/04
[52] U.S. Cl. .............................. 74/665 GE; 74/665 T; 74/467; 180/247; 180/251
[58] Field of Search .......... 74/467, 665 GA, 665 GE, 74/665 T; 180/247, 248, 249, 250, 251

[56] References Cited

U.S. PATENT DOCUMENTS

| | | | |
|---|---|---|---|
| 3,650,353 | 3/1972 | Abbott | 74/801 X |
| 4,442,729 | 4/1984 | Hayakawa | 184/6.12 X |
| 4,573,373 | 3/1986 | Shimizu et al. | 74/467 X |
| 4,632,207 | 12/1986 | Moore | 74/665 GE X |
| 4,690,015 | 9/1987 | Nagano et al. | 74/665 GE |
| 4,713,980 | 12/1987 | Ida et al. | 74/467 |

FOREIGN PATENT DOCUMENTS 61-270562  11/1986  Japan.

Primary Examiner—Dwight G. Diehl
Assistant Examiner—Christopher C. Campbell
Attorney, Agent, or Firm—Oliff & Berridge

[57] ABSTRACT

In a power transfer device including a housing, an input shaft rotatably mounted within the housing, an output shaft rotatably mounted within the housing and arranged coaxially with the input shaft for relative rotation thereto, a planetary gear unit arranged within the housing and having an input element mounted on the input shaft for rotation therewith and an output element connectable to the output shaft, and a clutch sleeve axially slidably mounted on the output shaft and shiftable between a first position in which it is retained to effect a drive connection between the input and output shafts and a second position in which it is retained to effect a drive connection between the output element of the gear unit and the output shaft, an oil pump assembly is arranged in parallel with the input shaft and mounted on an internal wall of the housing to be driven by the output element of the gear unit to pump up lubricating oil stored within the housing and supply it into an axial bore in the input shaft through an oil passage formed in a peripheral wall of the housing.

6 Claims, 2 Drawing Sheets

LUBRICATION MECHANISM IN POWER TRANSFER DEVICE FOR FOUR WHEEL DRIVE

BACKGROUND OF THE INVENTION

1. Field of the Invention

The present invention relates to a power transfer device for four-wheel drive vehicles, and more particularly to a lubrication mechanism for an ancillary change-speed mechanism in the power transfer device.

2. Description of the Prior Art

In U.S. Pat. No. 4,713,980 granted to Ida et al. on Dec. 22, 1987, there has been proposed a power transfer device adapted for use in combination with a power transmission, which comprises a housing adapted to be secured to one end of a casing of the power transmission, an input shaft rotatably mounted within the housing for drive connection to an output shaft of the power transmission, an output shaft rotatably mounted within the housing and arranged coaxially with the input shaft for relative rotation thereto, an ancillary change-speed mechanism in the form of a planetary gear unit arranged within the housing and having an input element mounted on the input shaft for rotation therewith and an output element connectable to the output shaft, and a clutch sleeve axially slidably mounted on the output shaft and shiftable between a first position in which it is retained to effect a drive connection between the input and output shafts and a second position in which it is retained to effect a drive connection between the output element of the planetary gear unit and the output shaft.

In the power transfer device described above, an oil pump assembly is mounted on the input shaft at the outside of the housing to be driven by rotation of the input shaft and is arranged to pump up lubricating oil stored in the housing and supply it into an axial bore in in the input shaft for lubrication of the components of the planetary gear unit. In such an arrangement of the oil pump assembly, however, the input shaft has to be extended for mounting thereon the oil pump assembly, and also the housing has to be enlarged for containing therein the oil pump assembly. This results in an increase in size and weight of the power transfer device.

SUMMARY OF THE INVENTION

It is, therefore, a primary object of the present invention to provide an improved power transfer device wherein an oil pump assembly is arranged in a space adjacent the input shaft in the housing to avoid such a problem as described above.

According to the present invention, the primary object is accomplished by providing a power transfer device wherein an oil pump assembly is arranged within the housing in parallel with the input shaft and is drivingly connected with the output element of the planetary gear unit to pump up lubricating oil stored in the housing and supply it into an axial bore in the input shaft for lubrication of the components of the planetary gear unit. Preferably, the oil pump assembly is mounted on an internal wall of the housing at a position adjacent the planetary gear unit to supply the lubricating oil into the axial bore in the input shaft through an oil passage formed in a peripheral wall of the housing.

BRIEF DESCRIPTION OF THE DRAWINGS

Other objects, features and advantages of the present invention will be readily appreciated as the same becomes better understood by reference to the following detailed description when considered in connection with the accompanying drawings, in which like reference characters and numerals designate the same or similar parts throughout the figures thereof and wherein.

DESCRIPTION OF THE PREFERRED EMBODIMENT

Figure 1:
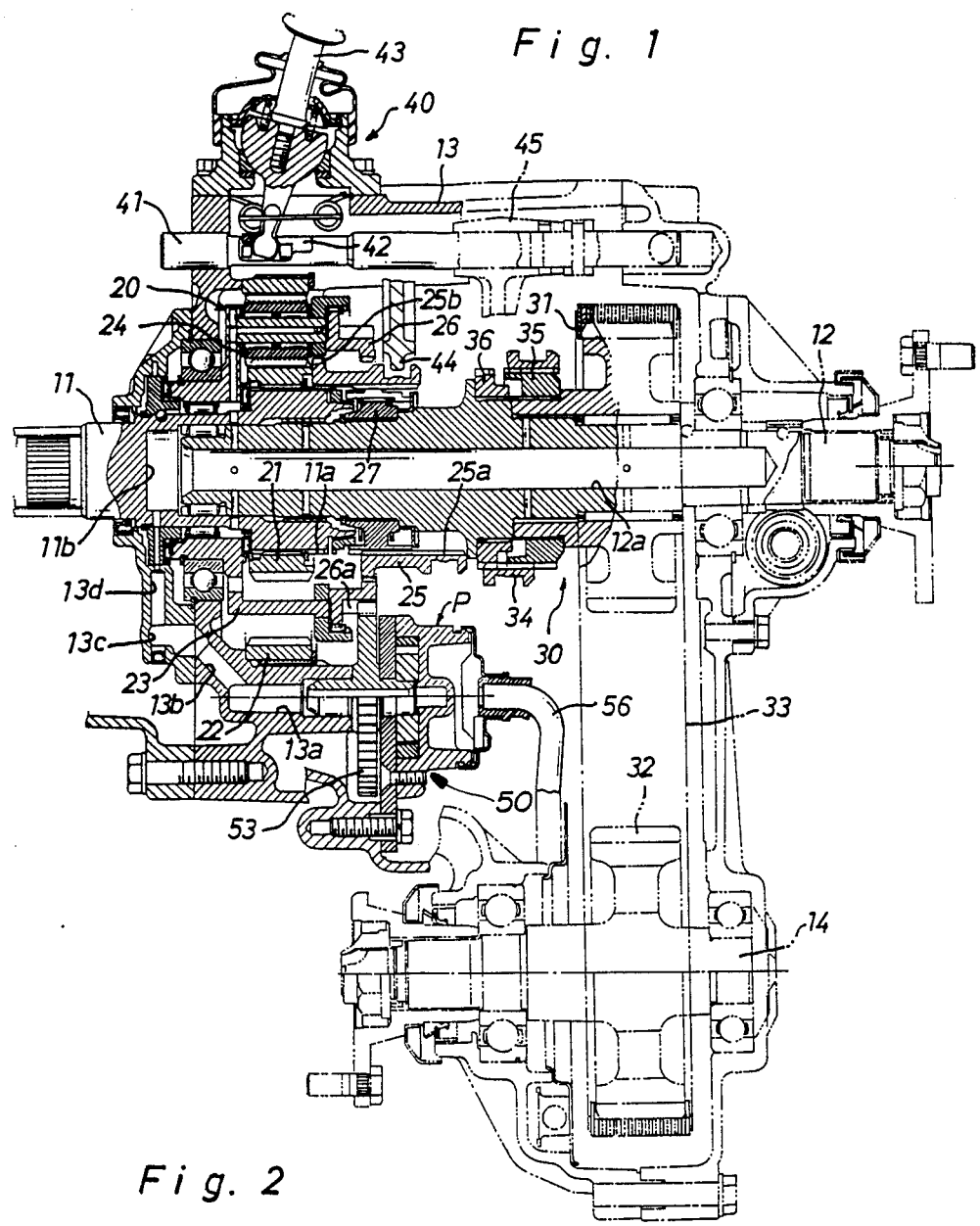
FIG. 1 is a full sectional view of a power transfer device in accordance with the present invention.

Referring now to the drawings, FIG. 1 illustrates a power transfer device for an automotive vehicle of the part-time four-wheel drive type. The power transfer device includes, as main components, an input shaft 11, a first output shaft 12, a second output shaft 14, an ancillary change-speed mechanism in the form of a planetary gear unit 20, a drive mechanism 30 for the second output shaft 14, a shift mechanism 40, and a lubrication mechanism 50.

The input shaft 11 is rotatably supported on a left-hand side wall of a housing 13 through a needle bearing, a carrier 23 of the planetary gear unit 20 and a ball bearing. The input shaft 11 has an internally splined portion for connection to an output shaft of a primary power transmission (not shown) of the vehicle and has an externally splined portion 11a for mounting the planetary gear unit 20 thereon. The first output shaft 12 is rotatably supported on a right-hand side wall of the housing 13 through a ball bearing and is arranged coaxially with the input shaft 11 for connection to rear wheel drive axles (not shown). The first output shaft 12 has an inner end portion coupled within a hollow inner end portion of input shaft 11 through a needle bearing for relative rotation. The second output shaft 14 is arranged in parallel with the input and output shafts 11 and 12 and is rotatably mounted within the housing 13 through a pair of axially spaced ball bearings for connection to front wheel drive axles (not shown).

The planetary gear unit 20 comprises a sun gear 21 mounted in place on the externally splined portion 11a of input shaft 11 for rotation therewith, a stationary ring gear 22 arranged concentrically with the sun gear 21 and secured to an internal cylindrical wall of housing 13, a plurality of planetary gears 24 rotatably supported by the carrier 23 and in mesh with the sun gear 21 and ring gear 22, and an internally splined side gear member 26 integrally fixed to the right end of carrier 23 for rotation therewith. An internally splined clutch sleeve 25 is axially slidably mounted on a hub member 27 which is fixed to the first output shaft 12 for rotation therewith. The clutch sleeve 25 has an internal spline 25a in continual engagement with an external spline of hub member 27 and engageable with the externally splined portion 11a through a synchronizer ring and has an external spline 25b engageable with the internal spline of side gear member 26. When retained in a first position as shown by an upper half in the figure, the clutch sleeve 25 is disengaged from the internal spline of side gear member 26 and is in engagement with the externally splined portion 11a of input shaft 11 to effect direct connection between the input and output shafts 11 and 12 so as to transfer drive torque from the input shaft 11 to the first output shaft 12 at the same speed as that of the input shaft 11. When shifted to and retained in a second position as shown by a lower half in the figure, the clutch sleeve 25 is disengaged from the externally splined portion 11a of input shaft 11 and engaged with the internal spline of side gear member 26 to drivingly connect the input shaft 11 to the first output shaft 12 through the planetary gear unit 20 so as to transfer drive torque from the input shaft 11 to the first output shaft 12 at a predetermined reduction speed ratio.

The drive mechanism 30 is provided to selectively transfer drive torque from the first output shaft 12 to the second output shaft 14. The drive mechanism 30 includes a drive sprocket 31 rotatably mounted on the first output shaft 12 through a needle bearing, a driven sprocket 32 integrally provided on the second output shaft 14, a drive chain 33 stretched over the drive and driven sprockets 31 and 32, and an internally splined clutch sleeve 34 axially slidably mounted on an externally splined hub member 35 fixed to the drive sprocket 31 and being engageable with an externally splined piece 36 fixed to the first output shaft 12. When retained in a first position as shown by an upper half in the figure, the clutch sleeve 34 is disengaged from the externally splined piece 36 to allow relative rotation between the drive sprocket 31 and the first output shaft 12 so as to provide a two wheel drive mode. When shifted to and retained in a second position as shown by a lower half in the figure, the clutch sleeve 34 is engaged with the externally splined piece 36 to rotate the drive sprocket 31 with the first output shaft 12 so as to provide a four wheel drive mode.

Figure 2:
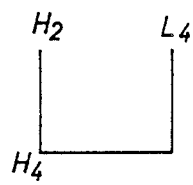
FIG. 2 is a shift pattern of a manual shift lever adapted to the transfer device.

The shift mechanism 40 includes a pair of parallel slide rods 41 and 42 axially slidably mounted within an upper portion of housing 13, a single manual shift lever 43 mounted on the housing 13 to be shifted by the operator in the vehicle compartment, a first shift fork 44 carried by the slide rod 41 and coupled with the clutch sleeve 25, and a second shift fork 45 carried by the slide rod 42 and coupled with the clutch sleeve 34. The manual shift lever 43 is arranged to be selectively connected to the slide rod 41 or 42 when operated in a select direction. In FIG. 2 there is illustrated a shift pattern of the manual shift lever 43, wherein the character H$_2$ indicates a high speed position for two wheel drive, and the characters L$_4$ and H$_4$ indicate low and high speed positions for four wheel drive, respectively. When the manual shift lever 43 is retained in the low speed position L$_4$ for four wheel drive in the shift pattern, the first shift fork 44 is positioned to retain the clutch sleeve 25 in the second position, while the second shift fork 45 is positioned to retain the clutch sleeve 34 in the second position. When the manual shift lever 43 is shifted to and retained in the high speed position H$_4$ for four wheel drive, the first shift fork 44 is positioned to retain the clutch sleeve 25 in the first position, while the second shift fork 45 is positioned to retain the clutch sleeve 34 in the second position. When the manual shift lever 43 is shifted to and retained in the high speed position H$_2$ for two wheel drive, the first shift fork 44 is positioned to retain the clutch sleeve 25 in the first position, while the second shift fork 45 is positioned to retain the clutch sleeve 34 in the first position.

Figure 3:
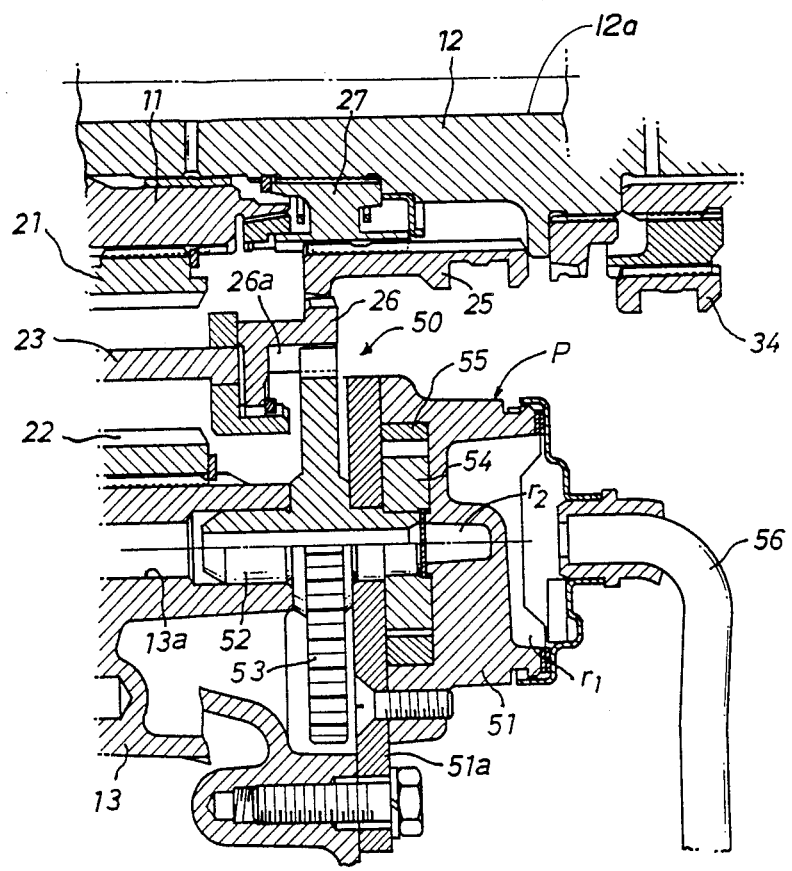
FIG. 3 is an enlarged sectional view of an oil pump assembly shown in FIG. 1.

The lubrication mechanism 50 includes an oil pump assembly P of the trochoid type mounted on an internal wall of housing 13 at a position adjacent the planetary gear unit 20 and arranged in parallel with the input shaft 11 in a space between the output shafts 12 and 14. As can be well seen in FIG. 3, the oil pump assembly P comprises a pump housing 51 fixedly mounted on the internal wall of housing 13 by means of an upright attachment plate 51a secured thereto, a hollow rotary shaft 52 rotatably supported by the attachment plate 51a at its one end portion, a driven gear 53 integrally provided on the rotary shaft 52, an inner rotor 54 contained within the pump housing 51 and mounted on the rotary shaft 52 for rotation therewith, and an outer rotor 55 arranged in surrounding relationship with the inner rotor 54 and rotatably coupled within a cylindrical cavity in the pump housing 51. The outer rotor 55 is eccentrically engaged with the inner rotor 54 to form a pump chamber in communication with inlet and outlet cavities $r_1$ and $r_2$ formed in the pump housing 51. The rotary shaft 52 is rotatably coupled within a stepped bore 13a which is formed in an internal projection of housing 13. The inlet cavity $r_1$ communicates into the bottom portion of housing 13 through a pipe 56, while the outlet cavity $r_2$ communicates into the stepped bore 13a through the hollow rotary shaft 52. The stepped bore 13a further communicates into an axial bore 11b in the input shaft 11 through oil passages 13b, 13c and 13d respectively formed in the left-hand side wall of housing 13 and a bearing retainer secured thereto. The axial bore 11b communicates into an axial bore 12a in the first output shaft 12.

In such an arrangement of the oil pump assembly P, the driven gear 53 is permanently in mesh with external teeth 26a of the side gear member 26 to be driven by rotation of the carrier 23 of planetary gear unit 20. In operation, the inner rotor 54 of oil pump assembly P is driven by rotation of the rotary shaft 52 and cooperates with the outer rotor 55 to pump up lubricating oil from the bottom portion of housing 13 through the pipe 56 and inlet cavity $r_1$. The lubricating oil under pressure discharged from the outlet cavity $r_2$ is supplied into the axial bore 11a in input shaft 11 through the rotary shaft 52, bore 13a and oil passages 13b, 13c, 13d and further supplied into the axial bore 12a in output shaft 12. Thus, the components of planetary gear unit 20 is lubricated by a sufficient amount of lubricating oil supplied thereto through axially spaced radial holes in the output shaft 12.

As is understood from the above description, the power transfer device is characterized in that the oil pump assembly P is arranged in the space between the output shafts 12 and 14 to be driven by the side gear member 26 of the planetary gear unit 20. Such an arrangement of the oil pump assembly is useful to shorten the axial length of the input and output shafts 11 and 12 in the power transfer device.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is, therefore, to be understood that within the scope of the appended claims, the invention may be practiced otherwise than as specifically set forth herein.

What is claimed is:

1. A power transfer device for automotive vehicles, comprising:
   a housing;
   an input shaft rotatably mounted within said housing;

an output shaft rotatably mounted with said housing and arranged coaxially with said input shaft for relative rotation thereto;

an ancillary change-speed mechanism arranged within said housing and mounted on said input shaft, said change-speed mechanism having an input element mounted on said input shaft for rotation therewith and an output element connectable to said output shaft;

a clutch sleeve axially slidably mounted on said output shaft and shiftable between a first position in which it is retained to effect a drive connection between said input and output shafts and a second position in which it is retained to effect a drive connection between the output element of said change-speed mechanism and said output shaft; and an oil pump assembly arranged within said housing to pump lubricating oil stored in said housing and supply it into an axial bore in said input shaft for lubrication of components of said change-speed mechanism;

wherein said oil pump assembly is mounted on a rotary shaft which is rotatably supported on an internal wall of said housing in parallel with said input and output shafts and is permanently in drive connection with the output element of said change-speed mechanism to drive said pump assembly during rotation of said input shaft.

2. A power transfer device as claimed in claim 1, wherein said oil pump assembly is arranged in parallel with said change-speed mechanism to supply the lubricating oil into the axial bore in said input shaft through an oil passage formed in a peripheral wall of said housing.

3. A power transfer device as claimed in claim 1, wherein said change-speed mechanism is in the form of a planetary gear unit including a sun gear mounted on said input shaft for rotation therewith, a stationary ring gear arranged concentrically with said sun gear, a carrier rotatably mounted on said input shaft, a plurality of planetary gears rotatably supported by said carrier and in mesh with said sun and ring gears, and an internally splined side gear member fixed to said carrier for engagement with an externally splined portion of said clutch sleeve, and wherein said oil pump assembly includes a driven gear provided on said rotary shaft and being permanently meshed with said side gear member for rotation therewith.

4. A power transfer device as claimed in claim 3, wherein said oil pump assembly is in the form of a trochoid pump which comprises an inner rotor mounted on said rotary shaft for rotation therewith.

5. A power transfer device as claimed in claim 1, further comprising a second output shaft rotatably mounted within said housing in parallel with said input and first-named output shaft and connectable thereto, said output member being drivingly connected to said second output shaft, and coupling means mounted on one side of said output member and shiftable between a first position in which it is retained to drivingly connect said output member to said first-named output shaft and a second position in which it is retained to disconnect said output member from said first-named output shaft, wherein said oil pump assembly is arranged in a space between said first-named and second output shafts to supply the lubricating oil into the axial bore in said input shaft and an axial bore in said first-named output shaft through an oil passage formed in a peripheral wall of said housing.

6. A power transfer device as claimed in claim 1, wherein said rotary shaft is in the form of a hollow shaft rotatably coupled within a stepped bore in the internal wall of said housing to supply therethrough the lubricating oil discharged from said oil pump into the axial bore in said input shaft through an oil passage formed in a peripheral wall of said housing and in open communication with said stepped bore.

* * * * *